May 10, 1955 W. J. SANEHOLTZ Re. 24,000

CHUTE DISCHARGE DEVICE FOR GRAIN BINS

Original Filed Oct. 13, 1953

INVENTOR.
Wilber J. Saneholtz
BY Nicholas W. Prasse
attorney

United States Patent Office

Re. 24,000
Reissued May 10, 1955

24,000

CHUTE DISCHARGE DEVICE FOR GRAIN BINS

Wilber J. Saneholtz, Napoleon, Ohio

Original No. 2,699,280, dated January 11, 1955, Serial No. 385,771, October 13, 1953. Application for reissue February 23, 1955, Serial No. 490,164

2 Claims. (Cl. 226—58)

Matter enclosed in heavy brackets [ ] appears in the original patent but forms no part of this reissue specification; matter printed in italics indicates the additions made by reissue.

This invention relates to discharge chute devices particularly adapted for grain bins and an object is to produce a new and improved device of this character which can be applied as a unit to a grain bin and which when in inoperative position is disposed substantially flush with the outer wall of the grain bin but which can be readily moved to operative position to enable the contents or a substantial portion of the bin to be emptied, provision being made for receiving bags into which the grain or the like flows, the structure further being designed to discharge the major portion of the bin before it is necessary to shovel out the remainder or that portion disposed between the chute and the bottom of the bin.

Other objects and advantages of the invention will hereinafter appear and for purposes of illustration but not of limitation an embodiment of the invention is shown on the accompanying drawing in which Figure 1 is a somewhat diagrammatic view in vertical sectional elevation showing a grain bin with a chute discharge device mounted in the front wall thereof to enable a substantial portion of the contents of the bin to be discharged;

Figure 1:
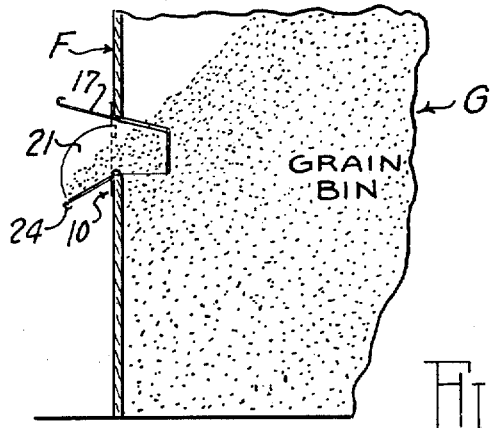
Figure 4:
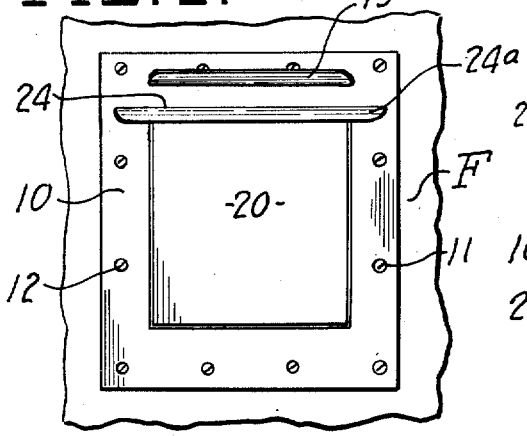
Figure 4 is a view similar to Figure 2 [1] but showing the chute device in its closed position.

The illustrated embodiment of the invention comprises a grain bin, having a vertically disposed front wall. Disposed in the front wall a desired distance above the floor line suitable for convenient handling is a rectangular opening. A discharge chute unit, hereinafter to be described is mounted in an opening O to enable the contents of the grain bin above this position to be conveniently emptied.

As shown the discharge chute unit comprises a rectangular sheet metal face plate 10, which has a rectangular opening 12. Secured to the rear face of the plate 10 is a substantially U shaped sheet metal wall having a pair of laterally spaced parallel side walls 13, only one of which is shown, and a rear wall 14. On the front edge of each of the side walls 13 is an inturned flange *15* which abuts against the rear face of the face plate 10 and in this instance is welded thereto *forming a rigid connection between the* U-*shaped sheet metal part and the face plate.* Thus the U-shaped wall structure is open at the top and the bottom but the edge of the top inclines downwardly and rearwardly from the face plate as best shown on Figure 3, whereas the bottom edge of the side walls 13 is at substantially right angles to the face plate 10.

Adjacent the upper edge of each of the side walls 13 is a guide strip 16 which may be spot welded in place and this provides a supporting guide for an imperforate plate

Figure 3:
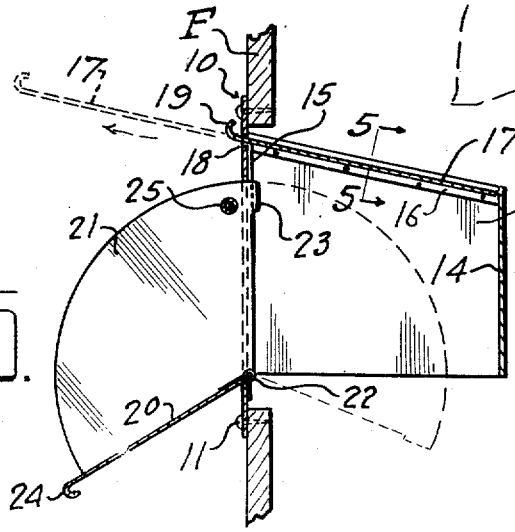
Figure 3 is a longitudinal sectional view substantially on the line 3—3 of Figure 2.

17, which, as indicated on Figure 3 inclines downwardly and rearwardly, similar to the top edges of the side walls 13. The plate 17 which constitutes a gate valve is slidable through an opening 18 in the face plate 10 above the rectangular opening 12 and that portion of the plate 17 which projects outside of the face plate in this instance is curled upwardly and inwardly to provide a handle which can be grasped for sliding the gate valve to and from its closed position.

It will be understood that when the gate valve 17 is slid outwardly as indicated by the broken lines on Figure 3, grain can enter the space therebelow and pass out through the opening 12 to the chute which will hereinafter be described. Thus by manipulation of the valve plate 17, the discharge of grain is controlled in a simple manner.

Figure 2:
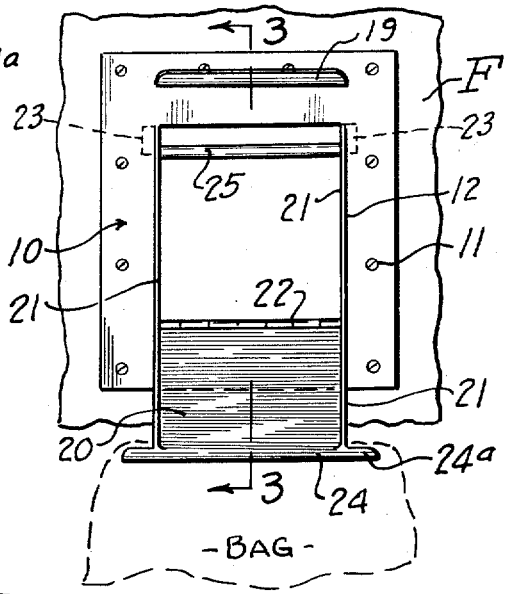
Figure 2 is a fragmentary front elevation of the discharge chute unit showing the chute in its opposite or open position and indicating a bag in position to be filled.
Figure 5:
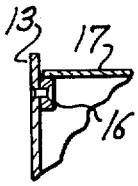
Figure 5 is a fragmentary sectional view along the line 5—5 of Figure 3.

The chute structure has a bottom imperforate sheet metal wall 20 from which rise at the side edges integral side walls 21 which are parallel with each other, the outer edges of which are in an arc determined by the swinging movement of the chute as will hereinafter appear. The inner end or lower end of the wall 20 is connected to the lower edge of the rectangular opening 12 of the face plate 10 by a hinge 22, thereby enabling the chute to rock about a horizontal axis and to swing to a downwardly inclined position particularly as indicated in Figure 3. It will be observed that the bottom wall 20 projects outwardly slightly beyond the side walls 21 in order to abut against the face plate 10 when the chute is in its closed or inoperative position. The outer end of the bottom wall 20 terminates in an inwardly curled portion 24 providing a handle. This inwardly curled portion has lateral extensions 24a which provide a bag support as indicated in Figure 2 when the chute is in its operative position. Thus the portion of the bag mouth can be hooked over the laterally extended portions 24a in order to receive the grain from the bin G.

At the inner end of each of the side walls 21 is an outwardly bent flange portion 23 which provides a stop to engage the adjacent inturned flange 15 of the respective side wall 13. This enables the chute to be swung outwardly to its operative position and supported in such position. In order to reinforce the side walls 21 a transverse rod 25 connects the two side walls 21 of the chute device adjacent the inner edges thereof and adjacent the top of the sidewalls.

From the above description it will be manifest that I have produced an exceedingly simple and inexpensive chute device which is particularly well adapted for grain bins. It can be installed with a minimum amount of time and effort and when in place can be used effectively to discharge the major portion of the grain from the bin. By inclining the upper edges of the side walls 13 it will be apparent that a greater volume of grain can be discharged before it is necessary for the workmen to climb into the bin and shovel the balance therefrom. The side walls 13 and rear wall 14 make it necessary for the grain from the bin to be concentrated within that enclosure, as will be readily understood. Of course in use the gate valve 17 is *pulled out to the broken line position of Figure 3* [retracted] to admit as much grain as is desired into the chute device. The [latter] *chute section* is designed to receive and conveniently support a portion of the mouth of the bag and after one bag is filled of course the gate valve 17 may be closed until the next bag is brought into position. When completed, of course, the chute device may be swung upwardly to its closed position and in which position no portion of the entire device projects into the room and therefore cannot be damaged by machines as in the case heretofore experienced of devices projecting out into the room.

It will be understood that numerous changes in details of construction, arrangement and operation may be effected without departing from the spirit of the invention especially as defined in the appended claims.

What I claim is:

*1.* A discharge chute unit for grain bins or the like comprising a face plate of sheet metal adapted to be applied to the front wall of a grain bin, the grain bin having an opening and the face plate having an opening in registry with the bin opening, a wall structure having a one piece U-shaped sheet metal part constituting a rear and side walls, inturned flanges on the free edges of the side walls welded to the rear side of the face plate, the upper edges of the side walls inclining downwardly and rearwardly, supporting means adjacent said inclined edge portions, a gate plate slidable on said supporting means, an aperture in said face plate above the opening therein through which projects the front end portion of said gate plate, a chute device pivoted adjacent the lower edge portion of the face plate opening, said chute device comprising a one piece U-shaped sheet metal wall member, lateral stop flanges on the upper portion of the side walls of said U member engageable with said inturned flanges to limit the outward swinging movement of the chute device, the bottom wall of the U member extending beyond the side walls to abut against the upper portion of the face plate, said extending portion being curled to provide a hand hold, lateral extensions upon opposite sides of said curled extruding portion to provide a bag mouth supporting means.

*2. A discharge chute unit for grain bins or the like comprising a face plate of sheet metal adapted to be applied to the front wall of a grain bin, the grain bin having an opening and the face plate having an opening in registry with the bin opening, a wall structure having a one piece U-shaped sheet metal part constituting a rear and side walls, a rigid connection between the free edges of the side walls and the rear side of the face plate, the upper edges of the side walls inclining downwardly and rearwardly, supporting means adjacent said inclined edge portions, a gate plate slidable on said supporting means, an aperture in said face plate above the opening therein through which projects the front end portion of said gate plate, a chute device pivoted adjacent the lower edge portion of the face plate opening, said chute device comprising a one piece U-shaped sheet metal member, stop means on the upper portion of the side walls of said U member forming the chute cooperating with the rear face of the face plate for limiting the outward swinging movement of the chute device, an extending portion on the bottom wall of the U member to abut against the upper portion of the face plate for limiting the inward swinging movement of the chute device, a hand hold on the upper portion of the bottom wall of said chute device, and bag mouth supporting means on said chute device and forming an integral part thereof.*

References Cited in the file of this patent or the original patent

UNITED STATES PATENTS

| | | |
|---|---|---|
| 164,122 | Alvord | June 8, 1875 |
| 618,160 | Barker | Jan. 24, 1899 |
| 634,243 | Leslie | Oct. 3, 1899 |
| 760,772 | Anderson | May 24, 1904 |
| 802,970 | Coracristi | Oct. 31, 1905 |